Aug. 21, 1945.  H. R. BATCHELDER  2,383,362
SEPARATION OF HYDROCARBON EMULSIONS
Filed Aug. 17, 1940
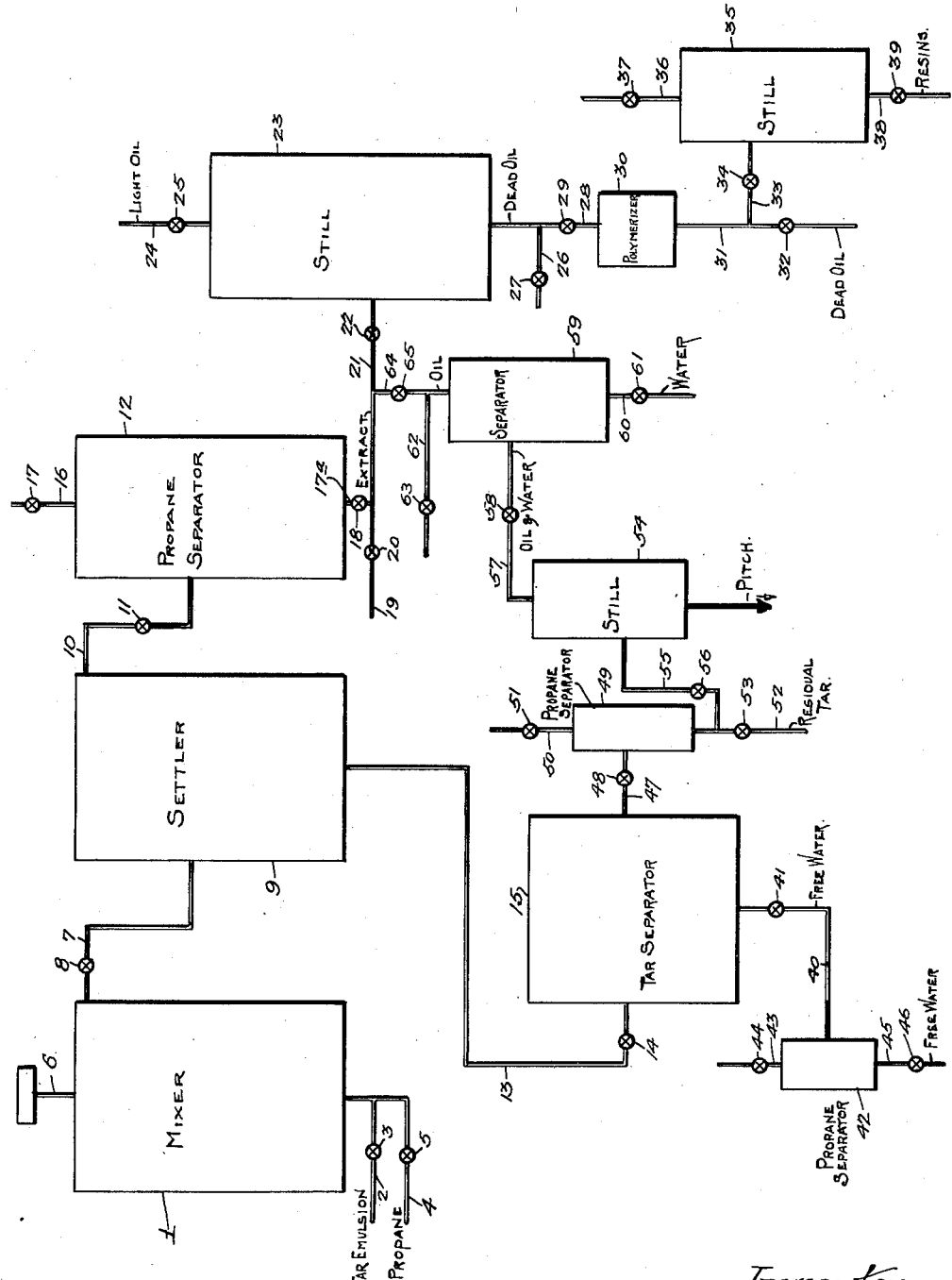
Inventor.
Howard R. Batchelder
By his Attorney.
Hugo A. Newman Patented Aug. 21, 1945

2,383,362

UNITED STATES PATENT OFFICE 2,383,362

SEPARATION OF HYDROCARBON EMULSIONS

Howard R. Batchelder, Drexel Hill, Pa., assignor to The United Gas Improvement Company, a corporation of Pennsylvania Application August 17, 1940, Serial No. 353,034

22 Claims. (Cl. 196—5)

The present invention relates to the separation of water from hydrocarbon-water emulsions.

More particularly, it relates to the separation of water from oil gas and carbureted water gas tar emulsions and the fractionation of hydrocarbon components thereof by means of liquefied normally gaseous hydrocarbon solvents.

In the manufacture of carburetted water gas and oil gas, petroleum oil is pyrolytically decomposed in vapor phase at relatively high temperatures in the presence of steam and/ or other diluent gases.

Depending upon the cracking environment and the oil employed the decomposition of the oil may produce varying quantities of products ranging from hydrogen to carbon, including methane, ethane, ethylene, propane, propylene, butanes, butylenes, butadiene, cyclopentadiene, isoprene, piperylene, benzene, toluene, xylenes, styrene, methyl styrenes, indene, naphthalene, methyl naphthalene, anthracene, and other heavy aromatic hydrocarbons, condensed ring compounds of asphaltic character and other saturated and unsaturated compounds.

The more readily condensible compounds are normally removed from the gas by condensation and/or scrubbing or other means. The extent to which condensation and/or other removal is carried out varies. In some cases substantial quantities of benzene and toluene may remain in the gas. In other cases the removal may include substantially all the $C_4$ hydrocarbons such as butadiene, or may include $C_2$ hydrocarbons such as ethylene.

In the condensation of the hydrocarbons from the gas relatively large volumes of water vapor are also condensed and a part or all of the resultant water forms emulsions with the liquid hydrocarbons. In these tar emulsions the water is in the inner or dispersed phase with liquid hydrocarbon material constituting the outer phase or dispersion medium. The quantity of emulsion and its stability varies with the oil employed and with the oil cracking environment. The quantity of water in the emulsion may vary up to say 90% or higher, and emulsions of great stability may be formed from which little or no water separates by gravity on prolonged standing.

Various theories as to the causes of tar emulsion formation have been advanced. In general, it has been thought that primarily the emulsifying agent is a hydrocarbon substance possibly of asphaltene characteristics which assists the oil components in forming a membrane surrounding the water droplets and preventing their coalescence, that the toughness of the film determines the stability of the emulsion, and that the effect of the membrane is enhanced by the presence of free carbon.

Whatever may be the correctness of the various theories, the tar emulsions are formed and constitute a problem in the processing of tars of the class described, not presented in the processing of certain other tars such as coal gas tars, in which little, if any, trouble from tar emulsions is encountered.

The tar with relatively high water content is generally termed wet tar or tar emulsion. The hydrocarbon content of the wet tar or tar emulsion is termed dry tar and comprises light oil boiling up to about 210° C., dead oil and residual tar. In general, the volatile portion of the dry tar and especially the higher boiling fractions thereof is predominantly aromatic in character. This is in contrast to the products of relatively lower temperature fractional distillation of petroleum oil in which lubricating oil is a desired product and in which it is desired to preserve as much as possible the paraffinic characteristics of the lubricating oil fraction.

Tar emulsions have little value per se. Even for use as boiler fuel the water content should not be higher than 25%. The dry tar may have great value, particularly if the oil cracking has been carried on so as to produce relatively large quantities of valuable resin-forming hydrocarbons, such as for instance, butadiene, cyclopentadiene, isoprene and piperylene, styrene, methyl styrenes, indene and other unsaturated aromatic hydrocarbons, which may be accompanied by valuable quantities of saturated aromatics such as benzene, toluene and xylenes.

Various methods of dehydrating wet tar of the class described have been proposed and employed including mechanical methods such as high speed centrifuging of hot tar; boiling to atmosphere to cause sufficient dehydration to produce boiler fuel, and distillation involving evaporation of substantially all the water content to produce dry tar and remove light oil and some dead oil. All such methods are relatively costly and not as effective in recovering valuable hydrocarbon constituents as the method of the present invention.

One object of the present invention is to provide a method of separating water from tar emulsion of the class described which is less costly than methods hitherto employed.

Another object of the present invention is to provide an economical method of separating the lighter hydrocarbon constituents of tars of the class described from the heavier hydrocarbon constituents of asphaltic characteristics.

Another object of my invention is the economical separation from the heavier hydrocarbon constituents of tars, of hydrocarbons not separated by ordinary methods of tar dehydration by distillation.

Another object of my invention is the separation from the residual tar of increased quantities of hydrocarbons boiling above 210° C.

Another object of my invention is the production from tars of the class described of residual tar with novel characteristics as distinguished from that obtained by distillation of the wet tar.

Other objects of the invention will appear as the specification proceeds and in connection with the description of the drawing which shows diagrammatically apparatus chosen for illustration by the use of which the invention may be practiced.

I have found that tar emulsions of the class described may be broken, water readily separated therefrom and the dry tar component of the emulsion fractionated by mixing with the emulsions a liquefied normally gaseous hydrocarbon solvent.

The invention will be particularly described in connection with the employment of propane as the hydrocarbon solvent. However, the use of other normally gaseous hydrocarbons is not precluded hereunder.

The proportion of propane to dry tar required for a given degree of separation of tar emulsion into water, oil and residual tar may vary with a number of factors including the chemical characteristics of the tar, the degree of mixing of propane with the emulsion, the temperature and pressure at which the extraction is carried out, and the time of extraction. The desired degree of separation may vary also depending upon factors including facility of handling the residual tar precipitated by the extraction.

The chemical characteristics of the tar treated may vary depending on the petroleum oil cracked, cracking environmental factors including temperature, time of contact, the presence or absence of catalysts, and condensation such, for instance, as the extent of condensation of materials from the gas and the degree of fractional condensation employed.

The invention may be readily practiced by batch or continuous operation.

Further features of the invention reside in the steps, combinations and sequences of steps, and in the construction, arrangement of and combination of parts, all of which together with other features will become more apparent to persons skilled in the art upon becoming familiar herewith and upon reference to the drawing in which Mixer 1 is provided with tar emulsion supply means such as connection 2, provided with valve 3, and liquefied propane supply means 4, provided with valve 5. The mixer is preferably provided with means for securing intimate mixing of the emulsion and propane such, for example, as is provided by a propeller mixer, the shaft of which is indicated at 6.

In the mixer at least a portion and preferably the bulk of the emulsion is broken by solution in propane of hydrocarbons comprised in the outer phase of the emulsion. After the expiration of the desired time of mixing, which may be termed the time of extraction, the materials are drawn off through connection 7, provided with valve 8, to the settler 9.

In the settler the mixture is permitted to settle and separate by gravity. Hydrocarbons dissolved in propane are drawn off through connection 10 provided with valve 11 to the propane separator 12.

The degree of separation in the settler may vary depending upon factors including the time of settling. Preferably, the separation is conducted so that the bulk of the dissolved hydrocarbons or extract and the bulk of the solvent may be drawn off without substantial inclusion of undissolved or precipitated material.

From the lower portion of the settler 9, undissolved or precipitated components of the emulsion comprising free water and residual tar are drawn off through connection 13, provided with valve 14, and passed to separator 15. The free water and residual tar passed to separator 15 may be accompanied by a portion of the hydrocarbons dissolved in propane, and the residual tar may include residual emulsion.

Returning to propane separator 12, separator 12 may conveniently comprise a propane still provided with suitable heating means (not shown), and adapted to distill propane from the solution of hydrocarbons in propane at sufficient pressure to permit the condensation of the separated propane at ordinary temperatures. The separator may be provided with suitable packing, if desired, and propane may be refluxed to any desired degree.

The separated propane is withdrawn overhead through connection 16, provided with valve 17, and after liquefaction may be recycled to mixer 1, if desired.

The separated extract is withdrawn from the lower portion of the separator 12 by way of connection 17a, provided with a valve 18, and may be passed to storage or other disposal by way of connection 19, provided with valve 20 or may be passed by way of connection 21, provided with valve 22, to the still 23. Still 23 may be provided with any suitable heating means (not shown).

In still 23 the extract may be fractionally distilled, in any desired degree, for instance, a separation may be effected between light oil boiling below about 210° C. and dead oil boiling above about 210° C. The light oil is removed overhead by way of connection 24, provided with valve 25, to storage, further fractionation, or other disposal.

In still 23, heat polymerizable aromatic resin-forming hydrocarbons boiling above 210° C. and present in the extract may be polymerized at least in part. These resin-forming hydrocarbons are polymerized by heat in the usual tar distillation methods and appear as part of and are lost in the residual tar. In the employment of the present invention, however, these heat polymerizable resin-forming hydrocarbons boiling above 210° C. may be present in large quantity in the extract and the polymerized resins may be readily separated therefrom.

The above mentioned resins and their production are described and claimed in copending application Serial Number 370,608, filed December 18, 1940, by Edwin L. Hall and Howard R. Batchelder.

From the lower portion of still 23, the dead oil which may contain considerable quantities of polymerized resin formers as above described, may be withdrawn by way of connection 26, provided with valve 27, to storage or other disposal or may be passed by way of connection 28, provided with valve 29, to polymerizer 30.

Polymerizer 30 may be provided with any suitable heating means and in it the polymerization of the resin formers may be completed or continued to the desired degree, with or without the aid of catalysts.

From the polymerizer, the dead oil with the polymerized resin formers may be withdrawn by way of connection 31, provided with valve 32, to storage or other disposal, or may be passed by way of connection 33, provided with valve 34, to still 35. Still 35 may be provided with any suitable heating means (not shown) and may be operated at any desired pressure.

In still 35 the resins may be separated from the dead oil, the dead oil being taken off overhead by way of connection 36, provided with valve 37, to storage, further fractionation or other disposal. The resins may be withdrawn from the lower portion of the still 35 by way of connection 38, provided with valve 39, to storage, further treatment or other disposal.

The light oil boiling up to about 210° C., which may be recovered in connection with the use of my invention, may contain greatly increased quantities of heat polymerizable aromatic unsaturated hydrocarbons boiling in the range between the boiling point of indene and 210° C., as compared with the quantities in light oil produced by conventional methods of tar distillation. In ordinary tar distillation methods, these compounds are largely polymerized during the distillation, the polymers forming part of the residual tar from which they can be separated only with great difficulty, if at all. The resin formers or their polymers may be readily separated from the light oil when my invention is employed with a large increase in the yield of such compounds.

Returning to separator 15. In separator 15, residual tar, which may include residual emulsion and will normally be accompanied by propane, is conveniently separated from the free water released from the emulsion by the foregoing extraction by gravity settling under pressure. Pressures of from 90 to 95 lbs. per sq. in. gauge have been found convenient. On the other hand, pressure may be reduced, if desired, prior to settling. Sudden reductions of pressure may cause a persistent dispersion of tar particles in the water, making complete separation of tar from water more difficult.

In the apparatus illustrated, the settling is conducted under pressure, the free water being drawn off from the lower portion of the separator by way of connection 40, provided with expansion valve 41 and passed to separator 42. Propane absorbed in the water and released by reduction in pressure may be flashed off and withdrawn by way of connection 43, provided with valve 44. Free water may be drawn off by way of connection 45, provided with valve 46, to waste or other disposal. Separator 42 may be maintained at such intermediate pressure as to permit the more economical liquefaction of the liberated propane, if desired.

The residual tar which may include residual emulsion and may be accompanied by a portion of the hydrocarbons dissolved in propane, is withdrawn from separator 15 by way of connection 47, provided with expansion valve 48, to separator 49. The reduction in pressure flashes off propane from the material entering separator 49, the propane being withdrawn by way of connection 50, provided with valve 51.

The separator 49 may also be maintained at an intermediate pressure sufficient to permit the more economical liquefaction of the liberated propane, if desired.

The residual tar which may include residual emulsion and hydrocarbons separated from solution in the propane flashed off, may be withdrawn through connection 52, provided with valve 53 to storage or other disposal or may be passed, if desired, to still 54 by way of connection 55, provided with valve 56.

In still 54 the residual emulsion may be broken, residual water and oil may be separated by distillation from the pitch constituents of the residual tar, and removed overhead by way of connection 57, provided with valve 58, to separator 59. The pitch may be removed from the lower portion of the still by any convenient means (not shown). If desired, the distillation may be carried to coke which may be removed from the base of the still by any convenient means (not shown).

In separator 59 oil and water may be separated by gravity, the water withdrawn by way of connection 60, provided with valve 61 and the oil by way of connection 62, provided with valve 63, leading to storage or other disposal. If desired, the oil may be passed by way of connection 64, provided with valve 65, to still 23 together with the extract from separator 12.

The proportion of the emulsion broken and the proportion of oil separated from the heavy hydrocarbons of asphaltic character will depend, other conditions being equal, upon the employed ratio of propane to dry tar. In order to facilitate the handling of the residual tar through the apparatus, it is preferred to leave in the precipitate sufficient oil to render the residual tar fluid.

Other conditions being equal, including the propane-dry tar ratio, the yields of extract tend to increase with increasing operating temperatures and pressures.

Compromise may readily be effected between the relative advantages of low propane-tar ratios and low pressure and temperature extraction conditions in effecting a desired degree of extraction.

I have found temperatures of the order of about 50° to 90° F. convenient when employing propane as the solvent as they are accompanied by relatively moderate pressures of the order of from about 90 to 165 lbs. per square inch, and require relatively moderate propane-dry tar ratios in the cases of many tar emulsions tested. However, higher or lower temperatures are in no way precluded hereunder. Very low temperatures have the disadvantage of increasing the viscosity of the residual tar. Very high temperatures such, for instance, as those in the neighborhood of the critical temperature of the hydrocarbon solvent have the disadvantage of accompanying high pressures but may have advantages in increased efficiency of extraction.

As previously stated other conditions being equal, the required propane-dry tar ratio for a given degree of extraction varies with the chemical character of the dry tar. Apparently, the propane ratio required varies directly as the average molecular weight of the dry tar though this may not be true in every case.

Ratios of propane to dry tar of from approximately 0.75 to approximately 2.80 by weight have been employed successfully in connection with tars of widely varying characteristics. These ratios are given for illustration and it is not intended to preclude in any way the employment of lower or higher ratios.

The following examples of the operation of my invention may be cited.

Example 1

A stable tar emulsion of the class described resulting from the pyrolysis of a naphthenic crude oil in the presence of approximately one pound of steam per pound of oil in an oil-gas set having an average set temperature of approximately 1490° F., the emulsion being formed on condensation of the resulting oil-gas to 90° F., was intimately mixed with liquefied propane over 95% pure in proportion of approximately 1.45 parts propane to 1 part of emulsion by weight. The emulsion contained approximately 45% water and approximately 55% dry tar by weight.

The propane and emulsion were mixed for approximately 15 minutes by means of a two-stage turbo mixer at an operating pressure of approximately 100 pounds gauge and a temperature of about 70° F. and the bulk of the emulsion broken. The material was allowed to settle by gravity for approximately 15 minutes and the dissolved hydrocarbons together with solvent drawn off from the water and residual tar. The solvent was flashed off from the separated solution and the extract fractionally distilled to separate light oil and dead oil. Residual solvent was also flashed off from the residual tar and water and the tar and water separated by gravity settling. The residual or extracted tar was distilled to pitch and residual water separated from the distillate by gravity settling. The distillate from the tar was fractionally distilled to separate dead oil and light oil.

The following were the approximate inputs and yields in pounds per pound of dry tar charged.

| Input: | Lbs./lb. of dry tar |
|---|---|
| Emulsion | 1.85 |
| Propane | 2.68 |
| Recovery: | |
| Extract— | |
| Light oil | 0.437 |
| Dead oil | 0.383 |
| Total | 0.820 |
| Extracted tar: | |
| Light oil | 0.011 |
| Dead oil | 0.003 |
| Pitch | 0.166 |
| Water | 0.142 |
| Total | 0.322 |
| Water decanted | 0.708 |

Percentage of total water in emulsion separated by extraction—83%.

In the heating of the dead oil 0.198 lb. of resins per pound of dry tar were produced through polymerization of aromatic heat polymerizable resin formers contained in the dead oil.

Example 2

The same emulsion was treated under the same conditions as in Example 1 except that the proportion of propane to emulsion was approximately 0.72 part propane to 1 part emulsion.

The input and yields in pounds per pound of dry tar were as follows:

| Input: | Lbs./lb. of dry tar |
|---|---|
| Emulsion | 1.85 |
| Propane | 1.33 |
| Recovery: | |
| Extract— | |
| Light oil | 0.412 |
| Dead oil | 0.370 |
| Total | 0.782 |
| Extracted tar: | |
| Light oil | 0.037 |
| Dead oil | 0.012 |
| Pitch | 0.167 |
| Water | 0.381 |
| Total | 0.597 |
| Water decanted | 0.469 |

Percentage of total water in emulsion separated by extraction—55.2%.

In the heating of the dead oil 0.177 lb. of resins per pound of dry tar were produced through polymerization of aromatic heat polymerizable resin-formers contained in the dead oil.

The time of extraction may vary, it being understood that times of extraction sufficiently long to arrive at or near equilibrium require a lower propane ratio for a given extraction than shorter times of extraction. The required time of extraction depends, other conditions being equal, upon the efficiency of mixing the emulsion and propane.

Employing an efficient stirring device such as a "Turbo mixer," I have found times of extraction of the order of 10 to 20 minutes convenient.

Preferably, hydrocarbons having three carbon atoms form the major portion of the liquefied normally gaseous hydrocarbon solvent employed hereunder and more preferably propane forms the major portion of said solvent.

Propane employed as the hydrocarbon solvent may be substantially pure or may contain other hydrocarbons such as propylene, ethane, ethylene, butanes, or butylenes.

Other liquefied normally gaseous solvents may be employed instead of propane, such, for example, as ethane, ethylene, propylene, butanes and butylenes, or mixtures of such compounds. For example, the liquefied normally gaseous solvent employed may be comprised principally of propane, or principally of butane. Factors such as character of the extract and extracted tar, pressure and temperature of operation, time of extraction and proportionate quantity of solvent employed may vary depending upon the solvent employed.

It may be advantageous under certain conditions to collect and treat separately the tars from different stages of fractional condensation of the gas. Such tars have different chemical characteristics and the character of the extract necessarily varies between such operations. The quantity of benzol present, for example, may modify the extraction and a relatively high percentage of benzol may cause the substantial solution of materials not dissolved to such an extent, if appreciably, in the presence of relatively small benzol concentrations.

Resins produced from extract derived from the heavier condensate fractions tend to be lighter in color than those derived from lighter condensate fractions.

High benzol concentrations may be present because of cracking the petroleum oil in the presence of additional benzol as described and claimed in the copending application by Newcomb K. Chaney Serial Number 220,649, filed July 22, 1938, now Patent No. 2,226,531, or benzol may be added to the emulsion if desired.

The residual tars produced in the employment of my invention differ materially from residual tars produced as a result of fractionating tar emulsions by distillation, because of the absence, in the residual tars produced hereunder, of the heat polymers which are produced in distilling tar emulsions.

The pitches produced on distilling the residual tars produced hereunder also differ materially from the pitches produced in cases in which the tar emulsions are fractionated by distillation, because of the separation from the tar, prior to the distillation of said tar to pitch, of substantial quantities of heat polymerizable unsaturates, which are present in the tar in cases in which the tar emulsions are fractionated by distillation.

In the claims the term "hydrocarbon undissolved in said solvent" is intended to include material of asphaltic characteristics unless otherwise qualified.

The invention is not to be considered limited by any theory advanced as to the causes of tar emulsion formation or separation. Neither is the invention limited by the specific examples nor the specific embodiments of the invention chosen for illustration thereof, modifications of which will readily occur to those skilled in the art upon becoming familiar with the invention.

I claim:

1. A method comprising commingling a tar emulsion comprised of products of pyrolysis of petroleum oil and water with a liquefied normally gaseous hydrocarbon solvent, said emulsion having water as the inner phase thereof and comprising hydrocarbon material at least in part soluble in said solvent, thereby dissolving at least a portion of said hydrocarbon material in said solvent and thereby liberating from said emulsion at least a portion of said hydrocarbon material and at least a portion of said water.

2. A method of fractionating a tar emulsion comprised of products of the pyrolysis of petroleum oil and water which comprises, commingling said emulsion with sufficient liquefied normally gaseous hydrocarbon solvent to cause separation of hydrocarbon components of said emulsion dissolved in said solvent from undissolved hydrocarbon components of said emulsion and water, and separating at least a portion of said hydrocarbon components dissolved in said solvent from said undissolved hydrocarbon components and from water.

3. A method of fractionating a tar emulsion comprised of products of the pyrolysis of petroleum oil and water which comprises, intimately mixing said emulsion with sufficient liquefied normally gaseous hydrocarbon solvent comprised of aliphatic hydrocarbon material of from 2 to 4 carbon atoms per molecule and of no greater unsaturation than one double bond per molecule to cause separation of hydrocarbon components of said emulsion dissolved in said solvent from undissolved hydrocarbon components of said emulsion and water, and separating at least a portion of said hydrocarbon components dissolved in said solvent from said undissolved hydrocarbon components and from water.

4. A method of fractionating a tar emulsion comprised of products of pyrolysis of petroleum oil and water which comprises, commingling said emulsion with sufficient liquefied normally gaseous hydrocarbon solvent to cause the breaking of at least a portion of said emulsion into at least three parts respectively comprised of hydrocarbons dissolved in said solvent and hydrocarbons undissolved in said solvent and water, and separating at least a portion of the part comprising hydrocarbons dissolved in said solvent from said other parts.

5. A method of fractionating a tar emulsion comprised of products of the pyrolysis of petroleum oil and water which comprises, intimately mixing said emulsion with sufficient liquefied normally gaseous hydrocarbon solvent comprised of aliphatic hydrocarbon material of from 2 to 4 carbon atoms per molecule and of no greater unsaturation than one double bond per molecule to cause the breaking of at least a portion of said emulsion into at least three parts respectively comprised of hydrocarbons dissolved in said solvent and material of asphaltic characteristics undissolved in said solvent and water, and separating at least a portion of said hydrocarbons dissolved in said solvent from said other parts.

6. A method of fractionating a tar emulsion comprised of products of the pyrolysis of petroleum oil and water which comprises, intimately mixing said emulsion with sufficient liquefied normally gaseous hydrocarbon solvent comprised principally of butane to cause separation of hydrocarbon components of said emulsion dissolved in said solvent from undissolved hydrocarbon components of said emulsion and water, and separating at least a portion of said hydrocarbon components dissolved in said solvent from said undissolved hydrocarbon components and from water, and separating said solvent from said separated dissolved hydrocarbons.

7. A method of fractionating a tar emulsion comprised of products of the pyrolysis of petroleum oil and water which comprises, intimately mixing said emulsion with sufficient liquefied normally gaseous hydrocarbon solvent comprised principally of propane to cause separation of hydrocarbon components of said emulsion dissolved in said solvent from undissolved hydrocarbon components and water, and separating at least a portion of said hydrocarbon components dissolved in said solvent from said undissolved hydrocarbon components and from water.

8. A method of fractionating a tar emulsion and recovering valuable hydrocarbons, said emulsion comprising products of the pyrolysis of petroleum oil and water and said products of the pyrolysis of petroleum oil including aromatic heat polymerizable unsaturated resin forming hydrocarbon material boiling between the boiling point of indene and about 210° C. which comprises, intimately mixing said emulsion with sufficient liquefied normally gaseous hydrocarbon solvent to cause separation of hydrocarbon components of said emulsion dissolved in said solvent including said unsaturated hydrocarbon material from undissolved hydrocarbon components of said emulsion and water, separating at least a portion of said hydrocarbons dissolved in said solvent from said undissolved hydrocarbons and water, separating solvent from the separated solution of hydrocarbons in solvent, fractionating the last named hydrocarbons, and recovering therefrom said unsaturated hydrocarbon material in a form selected from the group consisting of the monomeric and polymeric forms.

9. A method of fractionating a tar emulsion comprised of products of the pyrolysis of petroleum oil including unsaturated aromatic heat polymerizable resin-forming hydrocarbons boiling above about 210° C. and water which comprises, commingling said emulsion with sufficient liquefied normally gaseous hydrocarbon solvent to cause separation of hydrocarbon components of said emulsion dissolved in said solvent including unsaturated aromatic heat polymerizable resin-forming hydrocarbons boiling above about 210° C. from undissolved hydrocarbon components of said emulsion and water, separating at least a portion of said hydrocarbon components dissolved in said solvent including unsaturated aromatic heat polymerizable resin-forming hydrocarbons boiling above about 210° C. from said undissolved hydrocarbon components and from water, and separating solvent from said separated hydrocarbons.

10. A method of fractionating a tar emulsion comprised of products of the pyrolysis of petroleum oil including unsaturated aromatic heat polymerizable resin-forming hydrocarbons boiling above about 210° C. and water which comprises, intimately mixing said emulsion with sufficient liquefied normally gaseous hydrocarbon solvent comprised principally of hydrocarbons having three carbon atoms to cause separation of hydrocarbon components of said emulsion dissolved in said solvent including unsaturated aromatic heat polymerizable resin-forming hydrocarbons boiling above about 210° C. from undissolved hydrocarbon components of said emulsion and water, separating at least a portion of said hydrocarbon components dissolved in said solvent including unsaturated aromatic heat polymerizable resin-forming hydrocarbons boiling above about 210° C. from said undissolved hydrocarbon components and from water, and separating solvent from said separated hydrocarbons.

11. A method of fractionating a tar emulsion comprised of products of the pyrolysis of petroleum oil including unsaturated aromatic heat polymerizable resin-forming hydrocarbons boiling above about 210° C. and water which comprises, intimately mixing said emulsion with sufficient liquefied normally gaseous hydrocarbon solvent comprised of liquefied normally gaseous hydrocarbons having four carbon atoms to cause separation of hydrocarbon components of said emulsion dissolved in said solvent including unsaturated aromatic heat polymerizable resin-forming hydrocarbons boiling above about 210° C. from undissolved hydrocarbon components of said emulsion and water, separating at least a portion of said hydrocarbon components dissolved in said solvent including unsaturated aromatic heat polymerizable resin-forming hydrocarbons boiling above about 210° C. from said undissolved hydrocarbon components and from water, and separating solvent from said separated hydrocarbons.

12. A method of fractionating a tar emulsion comprised of products of the pyrolysis of petroleum oil and water which comprises, intimately mixing said emulsion with sufficient liquefied normally gaseous hydrocarbon solvent comprised principally of propane to cause the breaking of at least a portion of said emulsion into at least three parts respectively comprised of hydrocarbons dissolved in said solvent and material of asphaltic characteristics undissolved in said solvent and water, and separating at least a portion of each of said parts from said other parts.

13. A method of fractionating a tar emulsion comprised of products of the pyrolysis of petroleum oil and water which comprises intimately mixing said emulsion with sufficient liquefied normally gaseous hydrocarbon solvent comprised principally of butane to cause the breaking of at least a portion of said emulsion into at least three parts respectively comprised of hydrocarbons dissolved in said solvent and material of asphaltic characteristics undissolved in said solvent and water, and separating at least a portion of each of said parts from said other parts.

14. A process for breaking a tar emulsion which comprises commingling said emulsion with a liquefied normally gaseous hydrocarbon to form a plurality of layers including a water layer and a tar layer, and separating said layers.

15. A method of fractionating a tar emulsion and recovering valuable hydrocarbons, said emulsion comprising products of the pyrolysis of petroleum oil and water and said products of the pyrolysis of the petroleum oil including aromatic heat polymerizable unsaturated resin-forming hydrocarbon material boiling above approximately 210° C. which comprises, commingling said emulsion with a normally gaseous hydrocarbon solvent to cause separation of hydrocarbon components of said emulsion dissolved in solvent including said unsaturated aromatic hydrocarbon material boiling above approximately 210° C. from undissolved hydrocarbon components of said emulsion and water, separating at least a portion of said hydrocarbons dissolved in said solvent from said undissolved hydrocarbons and water, separating solvent from the separated solution of hydrocarbons in solvent, fractionating said last-named hydrocarbons and recovering therefrom said unsaturated aromatic hydrocarbon material in a form selected from the group consisting of the monomeric and polymeric forms.

16. A method comprising commingling a tar emulsion with a liquefied normally gaseous hydrocarbon solvent comprised principally of hydrocarbons having three carbon atoms and having less than two double bonds, said emulsion having water as the inner phase thereof and comprising hydrocarbon material at least in part soluble in said solvent, thereby dissolving at least a portion of said hydrocarbon material in said solvent and thereby liberating from said emulsion at least a portion of said hydrocarbon material and at least a portion of said water.

17. A method comprising commingling a tar emulsion with a liquefied normally gaseous hydrocarbon solvent comprised principally of hydrocarbons having four carbon atoms and having less than two double bonds, said emulsion having water as the inner phase thereof and comprising hydrocarbon material at least in part soluble in said solvent, thereby dissolving at least a portion of said hydrocarbon material in said solvent and thereby liberating from said emulsion at least a portion of said hydrocarbon material and at least a portion of said water.

18. A method of fractionating a tar emulsion comprised of products of the pyrolysis of petroleum oil including unsaturated aromatic heat polymerizable resin-forming hydrocarbons boiling above about 210° C. and water, which comprises intimately mixing said emulsion with sufficient liquefied normally gaseous hydrocarbon solvent comprised of aliphatic hydrocarbon material of from 2 to 4 carbon atoms per molecule and of no greater unsaturation than one double bond per molecule to cause separation of hydrocarbon components of said emulsion dissolved in said solvent including unsaturated aromatic heat polymerizable resin-forming hydrocarbons boiling above about 210° C. from undissolved hydrocarbon components of said emulsion and water, separating at least a portion of said hydrocarbon components dissolved in said solvent including unsaturated aromatic heat polymerizable resin-forming hydrocarbons boiling above about 210° C. from said undissolved hydrocarbon components and from water, and separating solvent from said separated hydrocarbons.

19. A method of fractionating a tar emulsion comprised of products of the pyrolysis of petroleum oil including unsaturated aromatic heat polymerizable resin-forming hydrocarbons boiling above about 210° C. and water, which comprises intimately mixing said emulsion with propane in a ratio to the tar content of said emulsion of between approximately 0.75 and 2.8 by weight and under temperature conditions between approximately 50° and 90° F. to cause separation of hydrocarbon components of said emulsion dissolved in said propane including unsaturated aromatic heat polymerizable resin-forming hydrocarbons boiling above about 210° C. from undissolved hydrocarbon components of said emulsion and water, separating at least a portion of said hydrocarbon components dissolved in said propane including unsaturated aromatic heat polymerizable resin-forming hydrocarbons boiling above about 210° C. from said undissolved hydrocarbon components and from water, and separating propane from said separated hydrocarbons.

20. The process of separating into phases mechanically separable by decantation a tar and water emulsion produced in the vapor phase pyrolysis in the presence of steam of petroleum oil and containing pitch admixed with aromatic resin-forming hydrocarbon unsaturates readily polymerizable by heat and boiling above 210° C. and other aromatic hydrocarbons in which one phase contains a large part of said aromatic resin-forming hydrocarbon unsaturates in unpolymerized form admixed with other aromatic hydrocarbons, and another phase contains said pitch, comprising admixing with said tar emulsion an aliphatic hydrocarbon solvent comprised of aliphatic hydrocarbon material of from 2 to 4 carbon atoms per molecule and of no greater unsaturation than one double bond per molecule in amount sufficient to cause the formation separate from said tar-water emulsion and separate from any free water of a liquid hydrocarbon phase comprising a solution in said solvent of a large part of said aromatic resin-forming hydrocarbon unsaturates in unpolymerized form together with other aromatic hydrocarbons soluble in said solvent while leaving the phase containing said pitch sufficiently fluid to be removed by decantation in effecting phase separation.

21. The process of separating into phases mechanically separable by decantation a tar and water emulsion produced in the vapor phase pyrolysis in the presence of steam of petroleum oil and containing pitch admixed with aromatic resin-forming hydrocarbon unsaturates readily polymerizable by heat and boiling above 210° C. and other aromatic hydrocarbons in which one phase contains a large part of said aromatic resin-forming hydrocarbon unsaturates in unpolymerized form admixed with other aromatic hydrocarbons, and another phase contains said pitch, comprising admixing with said tar-water emulsion propane in amount sufficient to cause the formation separate from said tar-water emulsion and separate from any free water of a liquid hydrocarbon phase comprising a solution in said propane of a large part of said aromatic resin-forming hydrocarbon unsaturates in unpolymerized form together with other aromatic hydrocarbons soluble in said propane, while leaving the phase containing said pitch sufficiently fluid to be removed by decantation in effecting phase separation.

22. The process of separating into phases mechanically separable by decantation a tar and water emulsion produced in the vapor phase pyrolysis in the presence of steam of petroleum oil and containing pitch admixed with aromatic resin-forming hydrocarbon unsaturates readily polymerizable by heat and boiling above 210° C. and other aromatic hydrocarbons in which one phase contains a large part of said aromatic resin-forming hydrocarbon unsaturates in unpolymerized form admixed with other aromatic hydrocarbons, and another phase contains said pitch, comprising admixing with said tar-water emulsion butane in amount sufficient to cause the formation separate from said tar-water emulsion and separate from any free water of a liquid hydrocarbon phase comprising a solution in said butane of a large part of said aromatic resin-forming hydrocarbon unsaturates in unpolymerized form together with other aromatic hydrocarbons soluble in said butane, while leaving the phase containing said pitch sufficiently fluid to be removed by decantation in effecting phase separation.

HOWARD R. BATCHELDER.